(12) United States Patent
Vermin et al.

(10) Patent No.: US 6,753,022 B1
(45) Date of Patent: Jun. 22, 2004

(54) DAIRY PRODUCT AND METHOD FOR PREPARING SAME

(75) Inventors: Reinier Johannes C. Vermin, Woerden (NL); Henry-Eric Spinnler, Sevres (FR)

(73) Assignee: Campina Melkunie B.V., LB Zaltbommel (NL)

( * ) Notice: Subject to any disclaimer, the term of this patent is extended or adjusted under 35 U.S.C. 154(b) by 0 days.

(21) Appl. No.: 09/787,004

(22) PCT Filed: Sep. 14, 1999

(86) PCT No.: PCT/NL99/00569
§ 371 (c)(1),
(2), (4) Date: May 23, 2001

(87) PCT Pub. No.: WO00/15042
PCT Pub. Date: Mar. 23, 2000

(30) Foreign Application Priority Data

Sep. 15, 1998 (NL) .............................. 1010096

(51) Int. Cl.⁷ ................................. A23C 9/12
(52) U.S. Cl. ............................ 426/43; 426/34; 426/42; 426/580; 426/583
(58) Field of Search .............................. 426/34, 36, 37, 426/42, 43, 580, 583

(56) References Cited

U.S. PATENT DOCUMENTS 3,563,760 A   2/1971   Kuwabara

FOREIGN PATENT DOCUMENTS

EP   0 346 884   12/1989
FR   2 123 295    9/1972

OTHER PUBLICATIONS

Kwak et al., "Biostabilization of Kefir with a Nonlactose–Fermenting Yeast," *Journal of Dairy Science*, 79 (6), 937–942, XP 000620045, Jun. 1, 1996.
Duitschaever et al., "Pure Culture Formation and Procedure for the Production of Kefir," *Milchwissenschaft*, 42 (2), 80–82, XP 00210383, 1987.
Kamaly et al., "Characteristics of Cheddar Cheese Made with Mutant Strains of Lactic Streptococci as Adjunct Sources of Enzymes," *Milchwissenschaft*, 44 (6), 343–346, XP 000027926, Jan. 1, 1989.

*Primary Examiner*—Leslie Wong
(74) *Attorney, Agent, or Firm*—Leydig, Voit & Mayer Ltd.

(57) ABSTRACT

The invention relates to a method for preparing a dairy product, in which a medium comprising milk or a milk product is treated under aerobic conditions with a lactose-negative, food-technologically acceptable microorganism, and is then kept under anaerobic conditions for some time. Furthermore, the invention relates to a dairy product obtainable by this method.

19 Claims, No Drawings

DAIRY PRODUCT AND METHOD FOR PREPARING SAME

CROSS REFERENCE TO RELATED APPLICATION

The present application claims priority of Vermin et al., PCT Application PCT/NL99/00569 filed on Sep. 14, 1999, and Vermin et al., Netherlands Application Serial No. 1010096 filed on Sep. 15, 1998 entitled "Dairy Product and Method for Preparing Same."

AREA OF THE INVENTION

The invention relates to a method for preparing a dairy product and to a dairy product obtainable by this process.

BACKGROUND OF THE INVENTION

In the course of years more and more different types of dairy products have been developed. The consumer can choose among a wide range of products, such as custard in all kinds of flavors, ice cream, yogurt and yogurt beverages, quark (curd cheese), Biogarde®, sour cream, whipped cream and créme fraiche.

A number of the available dairy products are so-called fermented dairy products. That is to say that in the preparation of these products a fermentation step is carried out. In such a fermentation step the product is treated with microorganisms and/or enzyme systems which converts the lactose present in the product to a greater or lesser extent. Such fermentations yield, depending on the employed microorganism or mixtures of microorganisms and enzymes, a dairy product having a characteristic flavor and texture. Examples of fermented dairy products are yogurt, Biogarde®, Biomild®, quark and sour cream.

In order to give dairy products, both fermented and non-fermented, a specific desired flavor, diverse additives are added. Many employed additives are sweeteners, flavorings, aromatics and colorings. In products such as custard, fruit yogurt and yogurt beverages, it is conventional to use artificial additives, fruit juices or plant extracts.

Of a number of dairy products the consumer wishes a natural variant. By this is meant a dairy product which owes its characteristic appearance and flavor to the nature of the dairy product itself, without additives being added. Dairy products of which in particular the availability of natural variants is expected are yogurt, quark, buttermilk and the like.

U.S. Pat. No. 4,675,193 discloses a two-step method for preparing a product having a cheese flavor. To this end, in the first step a flavor developing medium having a fat content between 0.5 and 50% (w/v) and a protein content between 0.3 and 12% (w/v), for instance milk or whey, is treated with a lipase and/or protease source. This step is carried out under aerobic conditions, after which the employed lipase and/or protease source is deactivated. In a second step a fermentation with a lactic acid producing microorganism is carried out.

As the lipase and/or protease source, non-pathogenic microorganisms are preferably used, such as *Penicillium roqueforti, Oidum lactis* (*Geotrichum candidum*), *Cladisporum butaryl*, Micrococcus and *Candida lipsolytica*. Preferably, *C. lipsolytica* is used.

The treatment step in which the flavor developing medium is used comprises a fermentation in which the lipase and/or protease source acidifies the medium to a pH between 4.5 and 5.5, followed by a deactivation.

SUMMARY OF THE INVENTION

It is an object of the invention to provide a dairy product which as regards texture corresponds to a known dairy product, such as yogurt or quark, but which has a different flavor and/or odor.

Surprisingly, it has been found that such dairy products can be prepared by bringing a specific aroma into the dairy product, which aroma is produced by a specific aerobic microorganism which is kept under anaerobic conditions for some time. Preferably, a conventional fermentation is carried out during this anaerobic period.

The invention relates to a method for preparing a dairy product in which a medium comprising milk or a milk product is treated under aerobic conditions with a lactose-negative food-technologically acceptable microorganism.

DETAILED DESCRIPTION OF PREFERRED EMBODIMENTS

It has been found that in a medium treated under aerobic conditions with a lactose-negative, food-technologically acceptable microorganism during an anaerobic period there are formed characteristic aromas. The nature of the aroma can be adjusted by the choice of the microorganism within the class of lactose-negative, food-technologically acceptable microorganisms.

The aroma imparted according to the invention to a dairy product originates from a microorganism which hardly changes the starting material for the dairy product to be prepared in the sense that lactose is not converted. There is thus obtained a dairy product which as regards the texture is substantially equal to known variants of the dairy product prepared, but which has a completely new flavor and/or odor.

On the other hand, the use of a lactose-negative microorganism in the preparation of a dairy product is known per se. In J. Dairy Sci., (1996) 79:937–942, Kwak et al. describe a method in which a lactose-negative yeast of the species *Saccharomyces cerevisiae* is used to stabilize kefir. Kefir is a traditional, Russian, fermented milk beverage containing a minor amount of alcohol and carbon dioxide. According to Kwak et al. the lactose-negative microorganism is used to produce alcohol in a preliminary phase under anaerobic conditions. After this preliminary phase an acidification with lactic acid bacteria is carried out.

The starting material for the method according to the invention is a medium comprising milk or a milk product. It is possible to use both a non-treated milk and a milk which has been subjected previously to a heat treatment, such as a pasteurization or sterilization.

In order to prevent outgrowth of any present, contaminating microorganisms, it is preferred to start from a milk which has been previously subjected to a heat treatment.

It is also possible to use a milk-derived product having an adapted fat content, such as skim milk or cream.

In addition to the milk or the milk product, the medium can and will generally comprise nutrients for the lactose-negative, food-technologically acceptable microorganism. It is conventional to subdivide these nutrients into carbon sources and nitrogen sources. suitable carbon sources are substances which can supply the carbon required for the ripening of the lactose-negative, food-technologically acceptable microorganism, and which are compatible with the dairy product (to be prepared). Examples are glucose and potato dextrose broth (PDB). Suitable nitrogen sources are substances which can supply the nitrogen required for the ripening of the lactose-negative, food-technologically acceptable microorganism and have no negative effect on the dairy product (to be prepared). Examples are malt extract, yeast extract and tryptone.

The choice of the nutrients to be used will depend on the nature of the lactose-negative, food-technologically acceptable microorganism. When the lactose-negative, food-technologically acceptable microorganism is a yeast, glucose, PDB and tryptone are preferably used as nutrients. When the lactose-negative, food-technologically acceptable microorganism is a bacterium, glucose and/or tryptone are preferably used as nutrients.

The amounts of the nutrients in the medium which form the starting material for a method according to the invention are adjusted to the nature of the lactose-negative, food-technologically acceptable microorganism. The total amount of added nutrients required for the aroma-forming microorganism should be sufficient to grow the microorganism, but not so large as to bring about an undesired aroma or an aroma of an undesired intensity. When the carbon source is PDB, in the case that the lactose-negative, food-technologically acceptable microorganism is a yeast, the amount thereof will range between 1 and 3 g. When in the same case tryptone is the nitrogen source, 0.2 to 1 g thereof will be used. When the carbon source is glucose, in the case that the lactose-negative, food-technologically acceptable microorganism is a bacterium, the amount thereof will range between 0.5 and 5 g. When in the same case tryptone is the nitrogen source, 0.2 to 1 g thereof will be used. All this can be simply established by those skilled in the art by way of experiment.

The microorganism with which the medium according to the invention is treated is a lactose-negative, food-technologically acceptable microorganism. By this is meant a microorganism which is not capable of converting lactose. In other words, when only lactose is present as the carbon source, the microorganism cannot grow.

Preferably, the lactose-negative, food-technologically acceptable microorganism is a yeast or a bacterium. Very suitable yeast strains are *Candida zelanoides* CBS 2328, *Candida zelanoides* ATCC 26318, *Debaryomyces hansenii* CBS 772, *Debaryomyces hansenii* ATCC 10623, *Saccharomyces cerevisiae* CBS 400, *Saccharomyces cerevisiae* CBS 437, *Candida robusta* CBS 420 and *Zygosaccharomyces rouxii* CBS 441. Very suitable bacteria originate from the strains *Micrococcus luteus* ATCC 4698, *Micrococcus luteus* CIP A270, *Arthrobacter nicotianea* ATCC 21279 and *Corynebacterium flavescens* ATCC 10340.

It is also possible to use combinations of lactose-negative, food-technologically acceptable microorganisms.

The choice of the lactose-negative, food-technologically acceptable microorganism or the combination of lactose-negative, food-technologically acceptable microorganisms can be suitably adjusted to the desired aroma. It has been found that by means of the treatment with the above microorganisms there can be produced a wide range of aromas, including caramel, chocolate, cheesy, nutty, garlic, and a neutral aroma which, however, makes the flavor of the fermentation product richer and rounder.

In order to obtain the desired aroma, the medium comprising the milk or the milk product is treated with the lactose-negative, food-technologically acceptable microorganism. This lactose-negative, food-technologically acceptable microorganism is added to the medium and ripened. The amount of the lactose-negative, food-technologically acceptable microorganism can be suitably adjusted to the amount of medium and the amount (the strength) of the desired aroma. The lactose-negative, food-technologically acceptable microorganism will generally be used in an amount of $10^6$ to $10^7$ per ml of milk or milk product.

The ripening of the lactose-negative, food-technologically acceptable microorganism is effected under aerobic conditions. The pH and the temperature during the ripening will depend on the employed specific lactose-negative, food-technologically acceptable microorganism. In most cases the pH will range between 6 and 7. The temperature will mostly be chosen between 25 and 30° C.

Preferably, the ripening is effected so as to be complete. The duration of the ripening depends on the W stationary growth phase of the employed microorganism; and will generally range between 12 and 24 hours. This has the result that the nutrients present in the medium are consumed and remainders of any nutrients added will hardly, if at all, find their way into the ready dairy product. The moment at which the ripening is complete, can be suitably determined by following the content of one or more of the nutrients, for instance of glucose. It is also possible to follow the growth of the lactose-negative, food-technologically acceptable microorganism by means of conventional plate counts.

After the ripening the resulting product is brought under anaerobic conditions for some time. It has been found that in the absence of oxygen the aromas of the ripening strain are formed and are excellently expressed.

During the aroma formation a neutral pH is preferably used. In most cases a period of 5 to 12 hours will be sufficient to obtain a proper aroma formation.

The thus obtained product is suitable per se for consumption. It will be clear that the formation of the desired aromas can take place for instance after the dairy product has been packaged into a container in which conventional anaerobic conditions prevail. Often, however, the resulting product will be thermized to increase the keeping quality. Furthermore, depending on the desired nature of the dairy product prepared, additional operations can be carried out.

In a preferred embodiment the anaerobic conditions coincide with a fermentation step. After addition of conventional fermentation strains an anaerobic fermentation is carried out in which lactose is converted into, inter alia, lactic acid.

More in detail, the product obtained after the ripening of the lactose-negative, food-technologically acceptable microorganism is treated with a lactic acid bacterium. Because of this treatment, the dairy product, particularly as regards texture and acidity, will show great similarities to known fermented dairy products, such as yogurt or quark. On account of the change in the acidity in a treatment with a lactic acid bacterium, this treatment is often designated as acidification.

The nature of the lactic acid bacterium will be suitably adjustable to the desired product by those skilled in the art. The treatment with the lactic acid bacterium can be carried out in the known manner and will be analogous to the treatment of a milk or milk product with a lactic acid bacterium in the preparation of fermented dairy products which have not been treated with a lactose-negative, food-technologically acceptable microorganism.

It will be clear that the invention also relates to a dairy product that can be prepared by a method as described above. Furthermore, the invention relates to the use of a dairy product that can be prepared according to the invention in the preparation of automated products in the food industry.

The invention will now be further explained on the basis of the following examples.

EXAMPLE 1

Yeast strains:
   Candida zelanoides CBS 2328 from ampoule
   Candida zelanoides ATCC 26318 from ampoule
   Debaryomyces hansenii ATCC 10623 from ampoule
   Debaryomyces hansenii ATCC 772 from ampoule
Bacterial strain:
   Arthrobacter nicotianea ATCC 21279 from plate
Glucose solution:
   8 g of glucose per 100 g of water (filter sterilized)
Yeast medium:
   24 g of potato dextrose broth (PDB of Difco 0549-17-9) +5 g of tryptone per liter of water.
Bacterial medium:
   5 g of tryptone per 900 ml of water. Sterilized at 120° C. for 15 min and enriched with 100 ml of glucose solution
Substrate:
   whole UHT-milk Culture A colony of lactose-negative microorganisms is added to water with glycerol and the solution is distributed over several ampoules and frozen. Subsequently, 1 ml of thawed medium is added to 25 ml of yeast of bacterial medium in an Erlenmeyer of 100 ml. The Erlenmeyer is closed with cellulose wadding and aerobically stored for 72 hours at 25° C. (yeasts) and 30° C. (bacteria) at a shaking speed of 200 rpm.

Pre-culture 5 ml of culture medium is added to 45 ml of whole UHT milk (substrate) in an Erlenmeyer of 250 ml which is closable with wadding. This solution is aerobically stored for 24 hours or 12 hours with shaking at 200 rpm and at the right temperature. After the pre-culture has been finished, the media are cooled to ca. 7° C.

Result

After an aerobic growth of the lactose-negative, food-technologically acceptable yeast Candida zeylanoides and an anaerobic aroma formation in milk, there is formed a product with a distinguishing flavor, to be associated with Munster cheese (stable flavor). When the starting material is lactose-negative bacterium Arthrobacter, a chocolate flavor is formed after an anaerobic aroma formation in milk. In this product branched chain aldehydes were the most important compounds that could be detected with "dynamic headspace GCMS".

EXAMPLE 2

Yeast strains:
   Candida zelanoides CBS 2328 from ampoule
   Candida zelanoides ATCC 26318 from ampoule
Bacterial strain:
   Arthrobacter nicotianea ATCC 21279 from plate
Lactic acid bacteria:
   For the preparation of yogurt
Glucose solution:
   8 g of glucose per 100 g of water (filter sterilized)
Yeast medium:
   24 g of potato dextrose broth (PDB of Difco 0549-17-9) +5 g of tryptone per 1 of water.
Bacterial medium:
   5 g of tryptone per 900 ml of water. Sterilized at 120° C. for 15 min and enriched with 100 ml of glucose solution
Substrate:
   whole UHT-milk Culture A colony of lactose-negative microorganism is added to water with glycerol and the solution is further distributed over several ampoules and frozen. Subsequently, 1 ml of thawed medium is added to 25 ml of yeast or bacterial medium in an Erlenmeyer of 100 ml. The Erlenmeyer is closed with cellulose wadding and aerobically stored for 72 hours at 25° C. (yeasts) and 30° C. (bacteria) at a shaking speed of 200 rpm.

Pre-culture 5 ml of culture medium is added to 45 ml of whole UHT milk (substrate) in an Erlenmeyer of 250 ml which is closable with wadding. This solution is aerobically stored for 24 hours or 12 hours with shaking at 200 rpm and at the right temperature. After the pre-culture has been finished, the media are cooled to ca. 7° C.

Acidification

The pre-culture is acidified under anaerobic conditions with a yogurt culture at 37° C. to final pH 4.5 and further packaged in cooled condition (to ca. 5–7° C.).

Result when both products obtained in Example I are acidified with lactic acid bacteria, there are formed products having a consistency comparable to that of yogurt and having a distinguishing flavor clearly different from the flavor of a non-pretreated, acidified milk product.

What is claimed is:

1. A method for preparing a dairy product comprising the steps of:
   (a) adding a lactose-negative, food-technologically acceptable microorganism to a medium comprising milk or a milk product;
   (b) ripening said microorganism under aerobic conditions; and
   (c) bringing the resulting product under anaerobic conditions such as to have aromas of the ripening microorganism formed.

2. The method according to claim 1, in which the microorganism is a yeast.

3. The method according to claim 2, in which the yeast originates from one of the following set of strains: Candida zelanoides, Debaryomyces hansenii spp hansenii, Saccharomyces cerevisiae, Candida robusta, or Zygosaccharomyces rouxii.

4. The method according to claim 1, in which the medium is treated under anaerobic conditions with a food-technologically acceptable lactic acid bacterium.

5. The method according to claim 1 in which the milk or milk product is sterilized.

6. A dairy product prepared by treating a medium comprising milk or a milk product under aerobic conditions with a lactose-negative, food-technologically acceptable microorganism to render a treated medium comprising milk or a milk product; and maintaining the treated medium comprising milk or a milk product under anaerobic conditions.

7. A method for producing a food comprising a dairy product comprising: introducing a lactose-negative, food-technologically acceptable microorganism to a medium comprising milk or a milk product, thereby imparting an aroma to the dairy product.

8. The method according to claim 6 further comprising preparing an aromatized food product including the dairy product.

9. The method according to claim 1, in which the microorganism is a bacterium.

10. The method of claim 2 wherein the milk or milk product is sterilized.

11. The method of claim 3 wherein the milk or milk product is sterilized.

12. The method of claim 4 wherein the milk or milk product is sterilized.

13. The dairy product according to claim 6, in which the microorganism is a yeast.

14. The dairy product according to claim 13, in which the yeast originates from one of the following set of strains: *Candida zelanoides, Debaryomyces hansenii* spp *hansenii, Saccharomyces cerevisiae, Candida robusta,* or *Zygosaccharomyces rouxii.*

15. The dairy product according to claim 6, in which the microorganism is a bacterium.

16. The method according to claim 15, in which the bacterium originates from one of the following set of strains: *Micrococcus luteus,* Arthrobacter, Corynebacterium or Arthrobacter ssp.

17. The method according to claim 6, in which the medium is treated under anaerobic conditions with a food-technologically acceptable lactic acid bacterium.

18. The method according to claim 6 in which the milk or milk product is sterilized.

19. The method according to claim 9, in which the bacterium originates from one of the following set of strains: *Micrococcus luteus,* Arthrobacter, Corynebacter or Arthrobacter ssp.

* * * * *